UNITED STATES PATENT OFFICE.

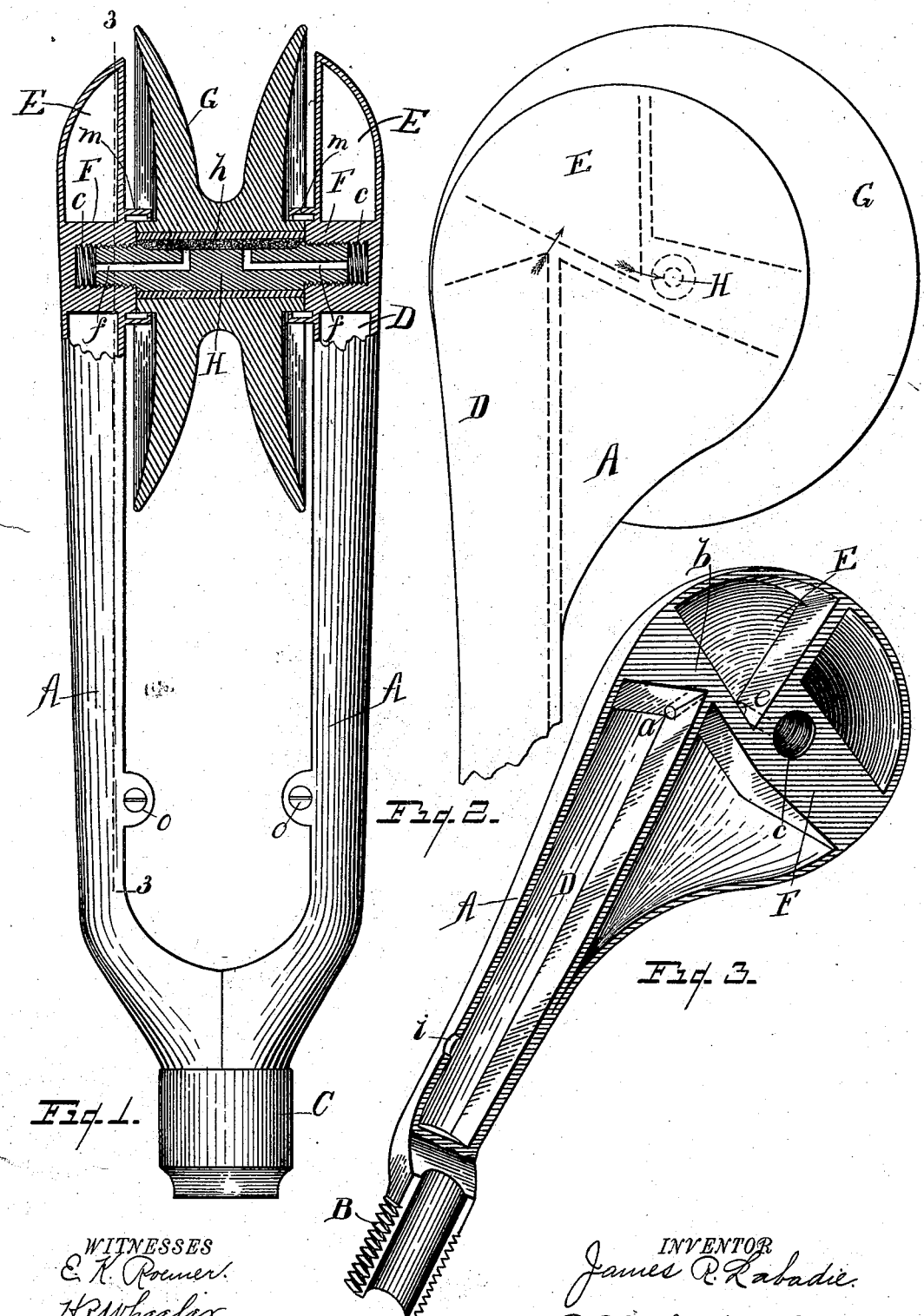

JAMES R. LABADIE, OF ECORSE, MICHIGAN.

TROLLEY-OILING DEVICE.

SPECIFICATION forming part of Letters Patent No. 513,067, dated January 16, 1894.

Application filed April 10, 1893. Serial No. 469,656. (No model.)

*To all whom it may concern:*

Be it known that I, JAMES R. LABADIE, a citizen of the United States, residing at Ecorse, in the county of Wayne, State of Michigan, have invented certain new and useful Improvements in Trolley-Oiling Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a trolley oiling device, and consists in the construction and arrangement of parts as hereinafter fully set forth, the essential features of which being pointed out particularly in the claims.

The object of the invention is to provide means for automatically supplying oil to the journal of the trolley wheel, in such manner as to effect a continuous and uniform feed thereof, and a further provision whereby the oil is prevented from dripping from the journal and becoming scattered by the wheel. This object is attained by the construction illustrated in the accompanying drawings, in which—

Figure 1 is an elevation of the upper or front edge of the trolley fork, the upper ends of which, as well as the wheel and its journal being in section. Fig. 2 is an enlarged side elevation, a portion of the fork being broken away. Fig. 3 is a perspective of the interior of one side of the trolley fork, as sectioned on line 3—3 of Fig. 1, showing the construction thereof.

Referring to the letters of reference, A designates the fork of the trolley, the side of which is formed independently, and provided with a threaded shank B, concavo-convex in cross section, which, when said sides are placed together form a hollow stem onto which the collar C may be screwed to retain them in place, and which serves as a socket for the reception of the trolley pole (not shown). The side of said fork is hollow, and is provided with dividing partitions forming the main oil reservoir D, running longitudinally of the fork and the supplementary oil chamber E, located in the upper end of the fork, and connected with the reservoir D, by means of the aperture $a$ passing through the intervening partition $b$.

F designates a solid portion of the fork which is provided with a threaded socket $c$ into which the ends of the axle H are adapted to be screwed, to couple the upper end of the side of the fork, and confine the wheel G upon said axle between their adjacent faces. Leading from the oil chamber E, is an aperture $e$ that communicates with the socket $c$ in each side of said fork, as shown in Fig. 3.

The axle H is provided with an aperture $f$ entering each end thereof to a point near its center and thence passing outward through the periphery of the axle, said apertures communicating with a groove formed longitudinally in the axle's periphery, in which a strip of felt or some absorbent $h$ is placed, which takes up the oil that flows through the apertures in the axle and applies it to the journal bearing, effecting a perfect lubrication thereof.

In the operation of this improved device, the reservoir D in each side of the fork is first filled with oil through the induct $i$ which is closed by a screw plug or cap $o$. The position of the trolley in service is such that the oil in the reservoir will not flow therefrom into the chamber E, except when the trolley is drawn down as in the act of reversing it as the end of the line, or in disengaging it from the trolley wire, when a sufficient quantity of oil will flow into the chamber to supply the trolley wheel for one or more trips. From said chamber the oil flows into the sockets $c$ and through the apertures in the axle to the bearing surface of the wheel, as shown by the arrows in Fig. 2. The absorbent in the groove in said axle prevents too great a flow of oil and supplies it evenly to the entire bearing surface making the lubrication constant and uniform.

To prevent the oil from dripping from the bearing onto the wheel and fork, a flange $m$ is formed around the socket $c$ which projects from the inner face of the side of the fork, and is provided with an inwardly turned edge so as to form an annular cup that will catch and retain any oil that may drip from the journal, said cup being provided with a discharge port (not shown) through which the oil may escape when the trolley is drawn down.

It is obvious that but one oil chamber need be employed, such as E, the capacity of which may be equal to the requirements for one day's running, and that the oil may be supplied entirely from one fork if desired.

Having thus fully set forth my invention, what I claim as new, and desire to secure by Letters Patent, is—

1. The combination of a trolley fork having an oil receptacle therein, the axle having an aperture that communicates with said oil receptacle, said aperture passing longitudinally of said axle and opening through its periphery, and the wheel adapted to revolve on said axle.

2. In an oiling device for trolley wheels, the combination of the trolley fork having the oil receptacle therein, the axle entering said fork and having an aperture that communicates with said receptacle, and a groove in said axle into which said aperture opens, and the absorbent in said groove.

3. In a trolley oiler, the combination of the fork having an oil reservoir and a supplementary oil chamber in communication and also having an axle receiving socket in communication with said chamber, the axle entering said socket and having an aperture that communicates therewith at one end and opens through the periphery of the axle at the other.

4. In a trolley oiler, the combination of the fork having the oil receptacles therein and having the threaded sockets in communication with said receptacles the threaded axle adapted to screw into said sockets and having the apertures that enter the ends thereof and passing longitudinally open through the periphery of the axle, and the absorbent located in a groove in said axle and over said aperture.

5. In a device for the purpose set forth, the combination of the fork having the oil receptacle therein, the axle entering said fork and having an aperture communicating with said receptacle, the wheel on said axle, and the annular flange extending from the inner face of the fork and embracing the hub of said wheel to receive the oil-drip, substantially as set forth.

In testimony whereof I affix my signature in presence of two witnesses.

JAMES R. LABADIE.

Witnesses:
E. K. ROEMER,
E. S. WHEELER.